M. H. GASSER.
PROCESS OF REMOVING CHAFF FROM COFFEE.
APPLICATION FILED JUNE 13, 1913.
1,092,831. Patented Apr. 14, 1914.
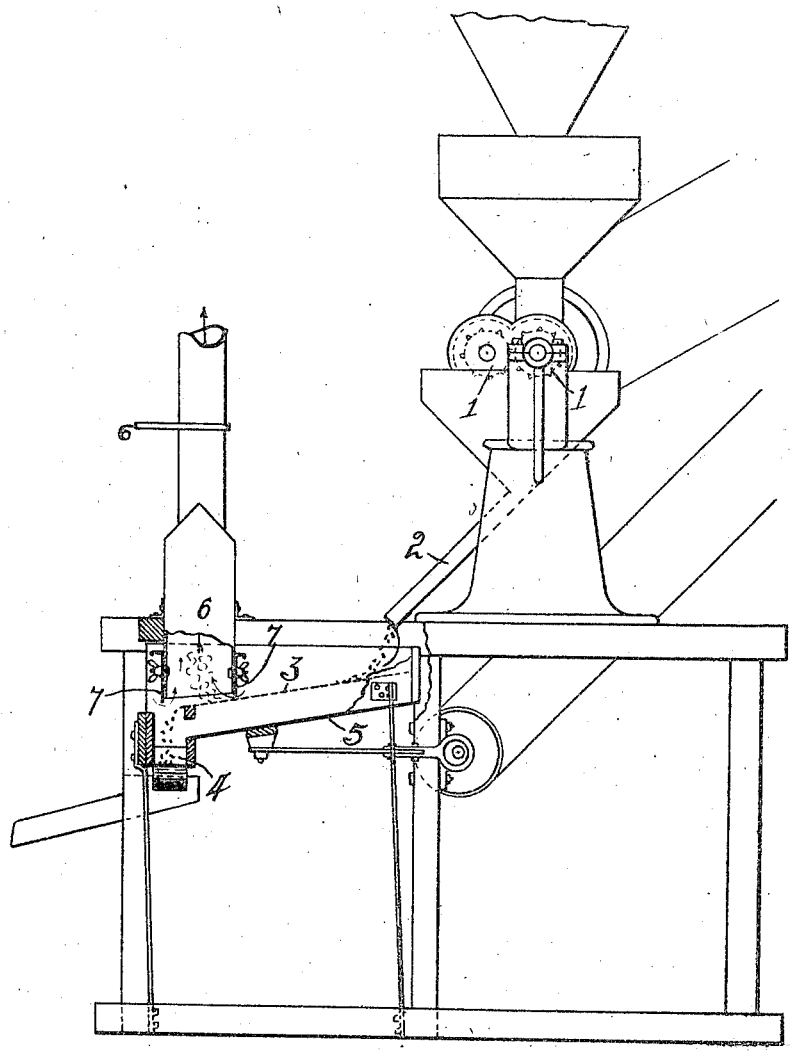
WITNESSES:
D. C. Walter
E. E. Thomas
INVENTOR.
Milton H. Gasser,
By Owen & Owen,
His attys.

UNITED STATES PATENT OFFICE.

MILTON H. GASSER, OF TOLEDO, OHIO.

PROCESS OF REMOVING CHAFF FROM COFFEE.

1,092,831.   Specification of Letters Patent.   Patented Apr. 14, 1914.

Application filed June 13, 1913. Serial No. 773,427.

*To all whom it may concern:*

Be it known that I, MILTON H. GASSER, a citizen of the United States, and a resident of Toledo, in the county of Lucas and State of Ohio, have invented a certain new and useful Process of Removing Chaff from Coffee; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates particularly to the treatment of coffee, whereby what is commonly known as "chaff" is separated therefrom. This chaff is present in the form of a thin skin between inner and outer portions of each seed of the coffee berry, and its presence in ground coffee is objectionable for different reasons well understood in the trade.

Numerous attempts have been made to remove chaff from coffee, and the method more commonly practised is to finely grind the coffee seeds and to then subject the ground coffee to an air suction or draft to remove the light chaff particles therefrom. This method is objectionable, however, for the reason that the finely powdered particles of coffee are removed to a considerable extent with the chaff thereby entailing a very considerable loss of the coffee itself.

The object of my invention is the provision of a simple and improved process for treating or acting on coffee whereby the chaff is nearly all, if not entirely, removed therefrom without any perceptible loss of the nutritious part of the coffee.

The invention is fully described in the following specification, and while, in its broader aspect, it is capable of being practised in numerous ways, one method of carrying out the same is illustrated in the accompanying drawing.

In the practising of my improved process, the coffee seeds or berries, as they are more commonly called, are first coarsely broken in any suitable manner to loosen or free the chaff therefrom, and the broken coffee is then subjected to an air draft or suction, which draws the light chaff therefrom. Inasmuch as the breaking of the coffee will necessarily produce more or less dust or fine particles it is preferable, after breaking the coffee and before subjecting it to the air draft, to pass it over a shaker sieve, the mesh or perforations of which are of suitable size to permit the finely broken particles of coffee to pass therethrough, thus preventing the passage of such small particles under the air draft and the consequent drawing of the same with the chaff from the broken coffee.

In the apparatus shown in the drawing for carrying out my process, 1, 1 designate crushing or breaking rolls between which the coffee is fed, such rolls being suitably spaced to cause a coarse breaking of the coffee seeds or berries in their passage therebetween. The coffee after being broken is delivered by a trough or chute 2 onto a shaker-sieve 3, being distributed across the same in a more or less even sheet, such sieve being inclined to cause the coffee to gradually work down the same and to fall therefrom into an inclined transversely extending delivery trough 4, which is movable with the sieve. The shaker mechanism is provided beneath the screen 3 with an imperforate bottom portion 5, which is inclined toward the trough 4 to deliver to such trough the powdered or fine coffee which drops thereon through the screen. Across the delivery end of the screen 3 is arranged a suction mouth-piece 6 connected with any suitable suction means whereby the chaff, as it passes under the mouth-piece with the coffee, is drawn upward from the coffee into the mouth-piece and thence delivered to any suitable point of discharge by the air draft. It is preferable to provide the front and rear sides of the mouth-piece 6 with gates or slides 7, which are adjustable to vary the space between the respective edges of the mouth-piece and the adjacent portions of the sieve.

It is found in practice that by the use of my improved chaff removing process for coffee, the chaff is almost entirely removed from the coffee without any material loss of the fine particles of coffee, thus making it of considerable value for use in coffee grinding factories.

I wish it understood that my invention is not limited to any particular apparatus or means for practising the same, or to all of the described details except in so far as such limitations are specified in the claim.

Having thus described my invention, what I claim as new, and desire to secure by Letters Patent, is,—

The process of removing chaff from broken coffee which consists in screening the fine particles of the coffee from the coarse particles and the chaff and then subjecting the coarse particles and chaff after screening out the fine particles to an upward draft of air while the coarse coffee and chaff are on the screen and the coarse particles are carried downward by gravity and fall through space to remove the light chaff therefrom.

In testimony whereof, I have hereunto signed my name to this specification in the presence of two subscribing witnesses.

MILTON H. GASSER.

Witnesses:
S. T. KLOTZ,
F. E. AUL.